US005118407A

United States Patent [19]

Beck et al.

[11] Patent Number: 5,118,407

[45] Date of Patent: Jun. 2, 1992

[54] ELECTROSTATIC SEPARATION OF PLASTIC MATERIALS

[75] Inventors: Martin H. Beck, Merrimack; George F. Rollend, Amherst, both of N.H.; Richard C. Nichols, Tyngsboro; John Muszynski, Auburn, both of Mass.

[73] Assignee: Devtech Labs, Inc., Amherst, N.H.

[21] Appl. No.: 598,031

[22] Filed: Oct. 16, 1990

[51] Int. Cl.[5] .......... B03C 7/02

[52] U.S. Cl. .......... 209/2; 209/127.2; 209/127.3; 209/129

[58] Field of Search .......... 209/127.1, 127.2, 127.3, 209/127.4, 129, 2, 3, 930; 521/405, 45.5; 241/24, 79.1

[56] References Cited

U.S. PATENT DOCUMENTS

| | | | |
|---|---|---|---|
| 3,309,569 | 3/1967 | Heyl et al. | 209/127.1 |
| 4,092,241 | 5/1978 | Mackenzie et al. | 209/127.2 |
| 4,570,861 | 2/1986 | Zentgraf et al. | 209/127.1 X |
| 4,895,642 | 1/1990 | Frei | 209/127.3 |

*Primary Examiner*—Donald T. Hajec
*Attorney, Agent, or Firm*—Davis, Bujold & Streck

[57] ABSTRACT

An apparatus and associated method of separating mixed fragments of different plastic materials, in which the materials to be separated are capable of carrying electrostatic charges of opposite polarities. The mixed charged fragments are given an induced electrostatic charge and are then exposed to electrostatic field of opposite polarities where they are separated by being allowed to migrate toward their respectively oppositely charged fields. The separated material fragments are then collected.

10 Claims, 3 Drawing Sheets

3
2
10
14
4
+
−
6,8
12
20
1

10
12
2
3
6,8
4
1
20
14

ELECTROSTATIC SEPARATION OF PLASTIC MATERIALS

This invention relates to the electrostatic separation of plastic materials.

BACKGROUND

Disposal of solid waste has been a growing problem and has risen to crisis levels in some parts of the country. One solution to the problem is to recycle materials that normally are landfilled. Various materials can be pulled from the waste stream and recycled with one such component being the different plastic materials.

Further, there are other industries that wish to reclaim materials. Industries such as wire & cable and automotive have a multitude of materials that have value and could be reclaimed. A major obstacle to the reclamation of commingled plastic materials is the extreme difficulty to separate them into discrete components.

It is important to note that reusing commingled plastics (i.e., without separation) is not cost effective nor efficient and further substantially reduces the properties of the plastic materials. For example, PET and PVC materials are not compatible. PET melts at about 500° F. while PVC will degrade at approximately 400° F. Upon degrading, PVC gives off hydrochloric acid which destroys the desirable properties of PET material. It should be noted that small amounts (on the order of 1 part in 500) of PVC mixed in with PET will destroy PET when the two materials are melted together.

Each of the noted industries, as well as other applications utilizing plastic materials, uses many different types of plastic materials. As an example but recognizing other industries or markets pertain also, the plastic packaging industry will be focused upon.

Typical rigid household plastic packages (bottles and other type containers) are made of 5 plastic materials. Other plastic materials are used as well, but the 5 highest volume materials are:

PE (Polyethylene; High Density (HDPE) Low Density (LDPE))

PET (PolyEthylene Terephthalate)

PVC (PolyVinyl Chloride)

PP (PolyPropylene)

PS (Polystyrene).

To collect the various plastic materials in an economic manner, all the different material bottles are thrown together and commingled. The bottles are either compacted (baled) or ground (chopped into smaller particles) for space reduction. The most efficient manner would be to grind the whole bottle at the point of collection. Because of the difficulties described in separating the ground particles, this method has not been widely introduced.

Some of the applications for the plastic containers are clear while some are colored (transparent→opaque). An existing method to separate the different materials is to sort by hand. This method is costly and fraught with error as many applications utilize two or more plastic materials. For example, edible oil bottles are made from both PET and PVC materials. This method can only be used with whole bottles and preferably when they are not crushed.

Another method being investigated to separate whole PVC bottles from other plastics is one which uses an energy source to excite the chlorine molecules which are then detected. The bottle is thus identified and ejected from the stream. This method is still experimental but it also has drawbacks in that whole bottles are required, it utilizes radiation sources such as x-rays which pose safety and health hazards and further make the system expensive to operate and maintain.

For ground commingled materials, a more effective manner of separating some of the plastic materials is to separate via the differences in density of the various plastic materials. Generally, this is effective only in separating the materials with densities with $<1$ g/cc. Materials with densities $<1$ g/cc generally are PE and PP.

The separation process generally is a float/sink operation where the lighter fractions float on water and are culled off while the heavier fraction sinks to the bottom. The heavy fraction would generally constitute PET, PVC and PS. The densities of these materials are very similar and in the case of PET and PVC they overlap. As an example; typical PVC densities range from 1.25 to 1.36 g/cc while typical PET ranges from 1.32 to 1.39 g/cc. With the overlap in densities, separation via the float/sink method (even using solvents with densities $>1$ g/cc) will not work.

SUMMARY

A novel method for separating ground flake has been developed and this constitutes the present invention . It has been discovered that if two ground commingled materials (e.g. PVC and PET) are placed in an electrostatic precharging chamber and the precharging chamber induces a static charge on the surface of the plastic particles, the PVC becomes negatively charged and the PET becomes positively charged. Further, if the particles are then exposed to charged poles (both + and − poles) the particles will become attracted to the opposite pole. The particles are not attracted to each other unless the static surface charge on the particle becomes too great. A key point is to put enough charge on the particles but not so great so that the particles are attracted to each other.

A device was constructed that allowed the commingled material to sit in a precharging hopper for an appropriate amount of time (30-60 seconds). The commingled material was then allowed to slide down a chute that had both + and − poles. Both the hopper and the chute were constructed of insulating materials, preferably of a material which was to be separated, i.e., PET or PVC. Further, a thicker sheet of material when used as the chute, gave better separation than a thinner or less insulating sheet.

The typical device (illustrated in FIGS. 1 and 2) that was used for the initial experiments allowed the particles to be bounced in the air so as to allow the charged particles to be pulled to its opposite charged pole. This was accomplished by placing a vibrating device on the bottom of the inclined sheet (chute) which in turn bounced the particles off the sheet into the air.

By allowing the ground plastic particles to be attracted to their opposite poles, two pure streams of materials are generated. It is important to note that there has to be present in the precharging hopper, a material capable of giving up and/or receiving electrons.

It has also been noted that different modes of the same material act differently. For example, PET can exist in three separate states;

amorphous biaxially oriented
crystallized.

Tests have shown that biaxially oriented material, though having significant separation, has less separation than amorphous or highly crystallized materials. However, by adding amorphous or highly crystallized particles to the biaxially oriented PET and PVC mix, the level of separation increases. The level of separation begins to approach 100% which is the general level achieved by amorphous or highly crystallized particles when mixed with PVC particles.

The PET and PVC separation trials are proceeding with excellent results. 100% purification has been achieved on some trials with one pass. 96% pass efficiencies (material yields) have been regularly achieved (for example: of 100 parts of starting PET, 4 parts have been trapped with PVC (the opposite case has also been achieved)). The "minglings" range from <1-15 percent of the collected stream.

Higher efficiencies have also been achieved (99%) with 2 passes (with material blends of 50/50).

Effectiveness Of Material Separation;

| | |
|---|---|
| PET/PVC | Excellent |
| PVC/PE | Good |
| PET/PC | Fair |
| PET/PS | Poor |
| PET/PE | Poor |

The system has good temperature range capability though highest humidity days deteriorates performance. Separation results obtained for different ratios of PET and PVC is equivalent; ranges tested 50:50 to 99:1 (PET:PVC). The presence of aluminum particles does not inhibit separation. Larger size particles require more energy for separation; with current power levels lower separation results are achieved.

SYSTEM SUMMARY

The commingled material, upon exposure to oppositely charged electrostatic fields, is divided into 3 streams:

a) Positive pole attraction;
b) Negative pole attraction; and
c) "Minglings".

The current system operates at a peak power level (per instrument) of 1,000 volts. However, commercial units should be on the order of 100,000 volts.

Having a positive and negative field is a key feature (as opposed to one of these and ground) together with precharging the material. However it should be noted that overcharging the material deteriorates performance as this causes the particles to be attracted to each other and to stick together. Having a similar material sheet (PET or PVC) improves the ability to give up or accept electrons which together with a surface smooth to minimize friction allows more effective separation to occur.

Test Variables
Temperatures of material
Dried (desiccant dryer)
Hot (heated in regular convection oven)
Room Temperature (as is with existing atmospheric conditions; generally hot and humid)
Air conditioned (≈75 degrees F.)

-continued

Refrigerated (stored in a freezer)
Material ratios (PET:PVC)
50:50
90:10
98:2
99:1
Material Mixtures
PET:PVC
PET:PE
PET:PC
PET:PS
PET:PVC:ALUMINUM
PET:PVC:PE
PET:PVC:PC
PET:PVC:MULTILAYER PP/PVDC
PVC:PE
Collector Sheets
PET thin
PET thick
PET double layer with air gap
PET monoaxially oriented
PET biaxially oriented
PVC thick
Acrylic thin
Acrylic thick
PC thin
PS thin
Glass
Environmental Results and Observations
Conditions
precharging and collector sheet stay in the environment
material is subjected to different environments as follows.
Hot humid environment
higher humidity yields a deterioration to overall results
Warm dry environment (spring conditions) yields good results
Air conditioned environment yields best results
Overall ranking stays essentially the same for different environments
Ranking of results
dried
hot
room temperature
refrigerated
Hot and room temperature can alternate depending on other variables

TABLE 1

SUMMARY OF TYPICAL PET RESULTS
% PURITY LEVELS
1 PASS

| | | PET COLLECTOR (%) |
|---|---|---|
| 1. | Dried material, 50:50 | 97.8 |
| 2. | Hot material, 50:50 | 98.6 |
| 3. | Room temp., 50:50 | 99.7 |
| 4. | Refrigerated, 50:50 | 91.9* |
| 5. | Dried material, 90:10 | 97.8 |
| 6. | Room temp., 90:10 | 100 |
| 7. | Refrigerated, 90:10 | 97.5* |
| Following tests all room temperature unless noted | | |
| 8. | PET/PS, 50:50 | Poor (random collection in all 3 collectors) |
| 9. | PET/PC, 50:50 | 70 (conversely the PC stream achieved 91.1% purity) |
| 10. | PET/PVC, 50:50 (plus aluminum) | 97.9 (free from PVC but aluminum was random) |
| 11. | PET/PVC, 98:2 | 100 |
| 12. | PET/PE, 50:50 | Poor (random collection in all 3 collectors) |
| 13. | PE/PVC, 50:50 (plus paper) | 100 pure PE (plus paper) |
| 14. | PET/PP multilayer | Poor (random collection in all 3 collectors) |

TABLE 1-continued

| SUMMARY OF TYPICAL PET RESULTS % PURITY LEVELS 1 PASS |
| --- |
| PET COLLECTOR (%) |
| Many trials were replicated to see if results were consistent. The above results are typical. There is no statistical differences in purity for the ranges of 97-100%. |

*Significant quantities in mingling collector

TABLE 2

| SUBJECTIVE RANKING OF DIFFERENT SHEET MATERIAL | |
| --- | --- |
| SHEET MATERIAL | RANK |
| PET thick (.070 in) | E |
| PET thin (.030 in) | G |
| PET double layer with air gap | G-E |
| PET monoaxially oriented | G |
| PET biaxially oriented | NA |
| Acrylic thin | P |
| Acrylic thick | G |
| PC thin | F |
| PVC thick | G-E (!) (more tests needed) |
| PS (.055 in) | F |
| Glass | G |
| Aluminum only | P |

E = Excellent
G = Good
F = Fair
P = Poor

The invention will now be described, by way of example, with reference to the accompanying drawings, in which.

The construction and features of the separators will be readily apparent to the skilled artisan from the drawings, the above remarks and the following.

Figure 1:
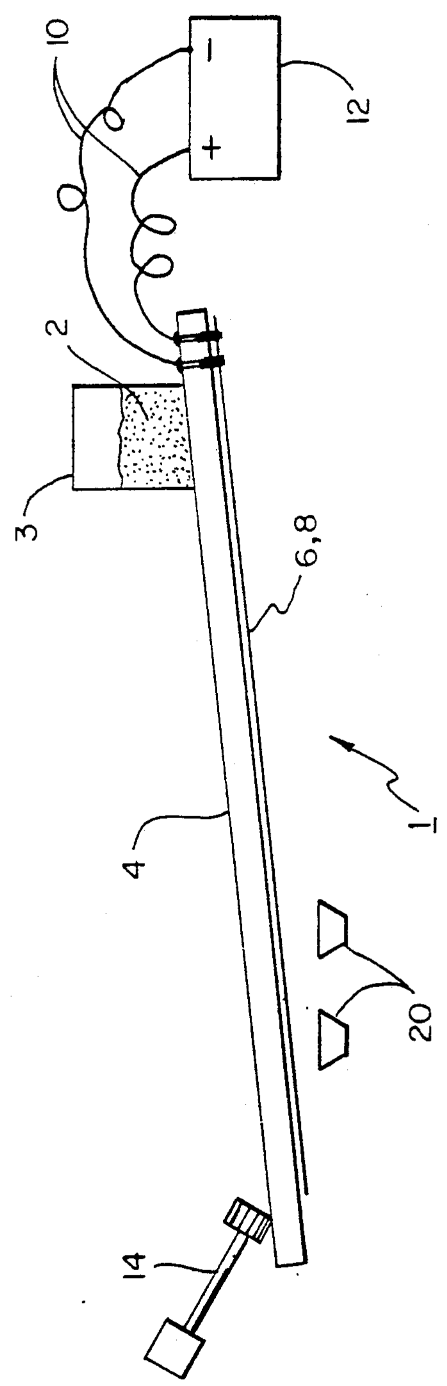
FIG. 1 is a diagrammatic side elevation of a first experimental electrostatic plastic material separator.
Figure 2:
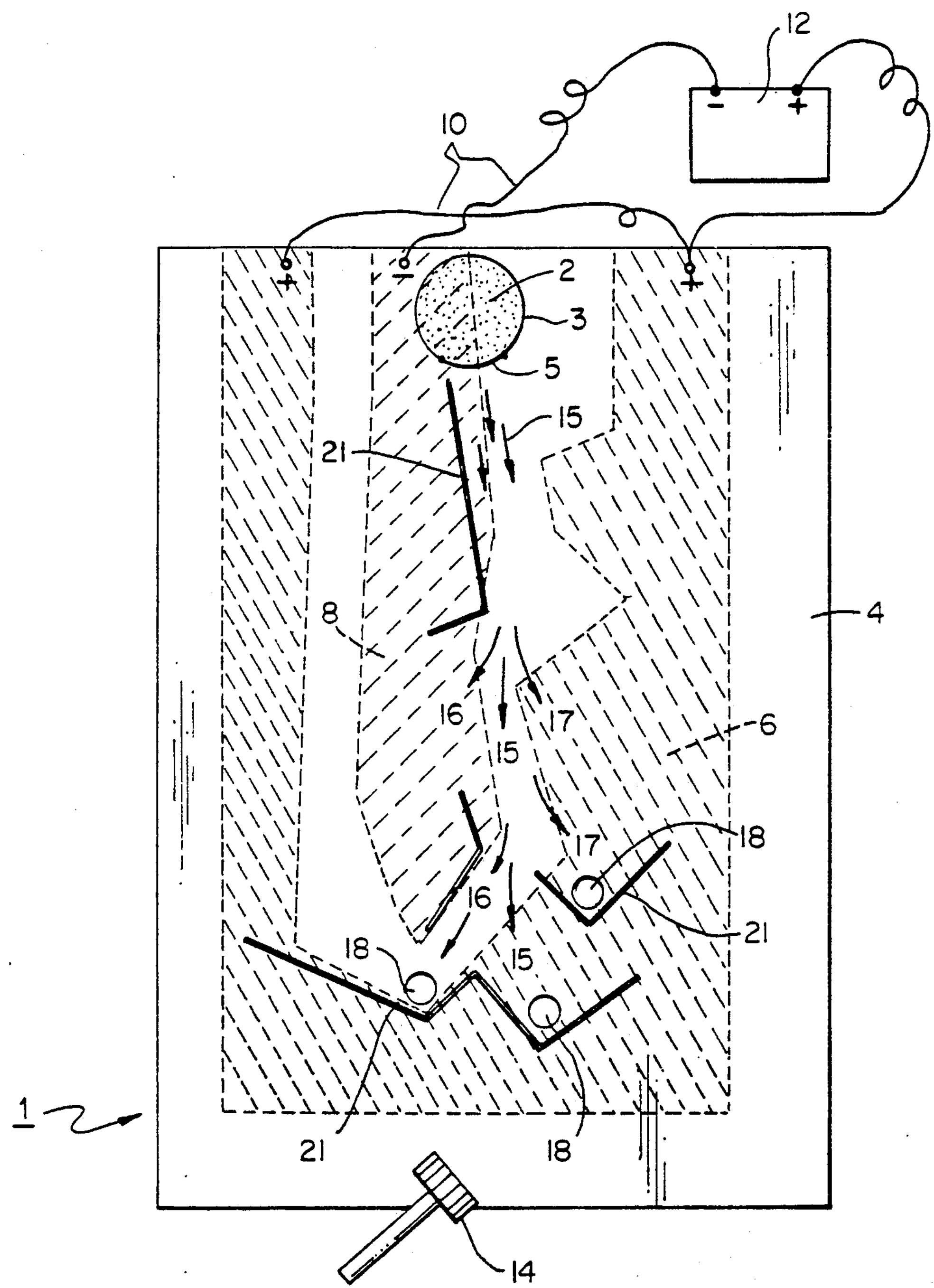
FIG. 2 is a diagrammatic plan of the separator of FIG. 1.

Turning to FIGS. 1 and 2, a first embodiment is detailed illustrating an electrostatic separator for separation of ground PVC and PET, or other commingled plastic particles 2, each preferably ⅜ inch or less in size. The separator comprises an electrostatic precharging hopper 3, which is mounted at or near the top of an inclined sheet 4, wherein the hopper and the inclined sheet 4 are made up of insulating materials, preferably one of the plastic materials to be separated (in this embodiment; PET) to assist in the transfer of electrons.

Two strips of conductive material 6, 8, typically aluminum foil, are attached to the underside of the inclined sheet 4, positioned so that one strip 6 continuously traverses the two sides and the bottom edge of the sheet 4 while the second strip 8 is centrally located from the top edge of the sheet 4 extending therefrom toward the first strip bottom edge. The strips 6, 8 are separated from one another by an insulating gap and are attached to an electric generator 12 by means of leads 10, the second strip 8 being attached to the negative terminal and the first strip 6 being attached to the positive terminal of the generator 12, thereby producing oppositely charged electrostatic poles defined by the strips 6 and 8. Other configurations involving conductive strips are possible provided that separate, oppositely charged electrostatic fields are created.

The hopper 3 has a gate means 5 which can be opened to release the commingled particles allowing them to migrate down the inclined sheet 4. A vibration device 14 enhances this migration by causing the commingled particles to bounce into the air as they proceed down the chute formed by the incline.

Further, the sheet 4 has three collection holes 18 located on its lower half to collect separated particles wherein each hole 18 has a corresponding collection cup 20 placed underneath it to collect particles which drop through. Finally, path diverters 21 are attached to the top of the inclined sheet 4 to assist in the separation and collection process. Diverters are not shown in FIG. 1.

In use, the commingled PVC and PET particles 2 are placed in the precharge hopper 3 where they receive an induced electrostatic charge causing the surface of the PET particles to become positively charged and the surface of the PVC particles to become negatively charged. The precharge hopper 3 is made from insulating material, preferably of a plastic material to be separated (PET in this embodiment), to facilitate the transfer of electrons. The induced charge must be applied for a sufficient duration and at a sufficient strength to create opposite charges on the surfaces of the plastic particles but should not be great enough to cause the particles to attract one another, preventing separation. It has been found that a charge of between 3000 and 10,000 volts for a period of 30 seconds to 60 seconds produces adequate results.

The mixed particles 2 upon acquisition of the induced charge are released from the hopper 3 by opening the gate 5 allowing the particles to migrate down the inclined sheet 4 facilitated by the vibrating member 4 whose oscillations causes the particles to bounce into the air.

The conductive strips of aluminum foil 6, 8 placed on the underside of the inclined sheet act as positive and negative poles respectively, produce electrostatic fields of opposite polarity.

The mixed particles, having acquired an induced charge, are attracted to oppositely charged poles, meaning that the positively charged PVC particles are drawn toward the negative pole 8, while the negatively charged PET particles are drawn toward positive pole 6. This electrostatic attraction of unlike charged particles causes the central stream 15 of mixed PCT/PET particles to separate into divergent streams of pure PVC 17 and pure PET 16, respectively, while the remaining central stream 15 contains those mingled particles which either did not develop a sufficient induced charge while in the hopper 3, or developed too great a charge causing interparticular attraction.

The particles are then collected by means of holes 18 with collector cups 20 placed underneath the holes to capture the separated PVC and PET particle streams 16, 17 as well as the mingled particle stream 15.

Diverters 21 placed along the top surface of the sheet 4 facilitate the migration of the separated particles 2 toward their respectively oppositely charged fields as well as assist in collection of those materials by trapping the separated material streams 15, 16, 17 at or near their respective collection hole 18.

Figure 3:
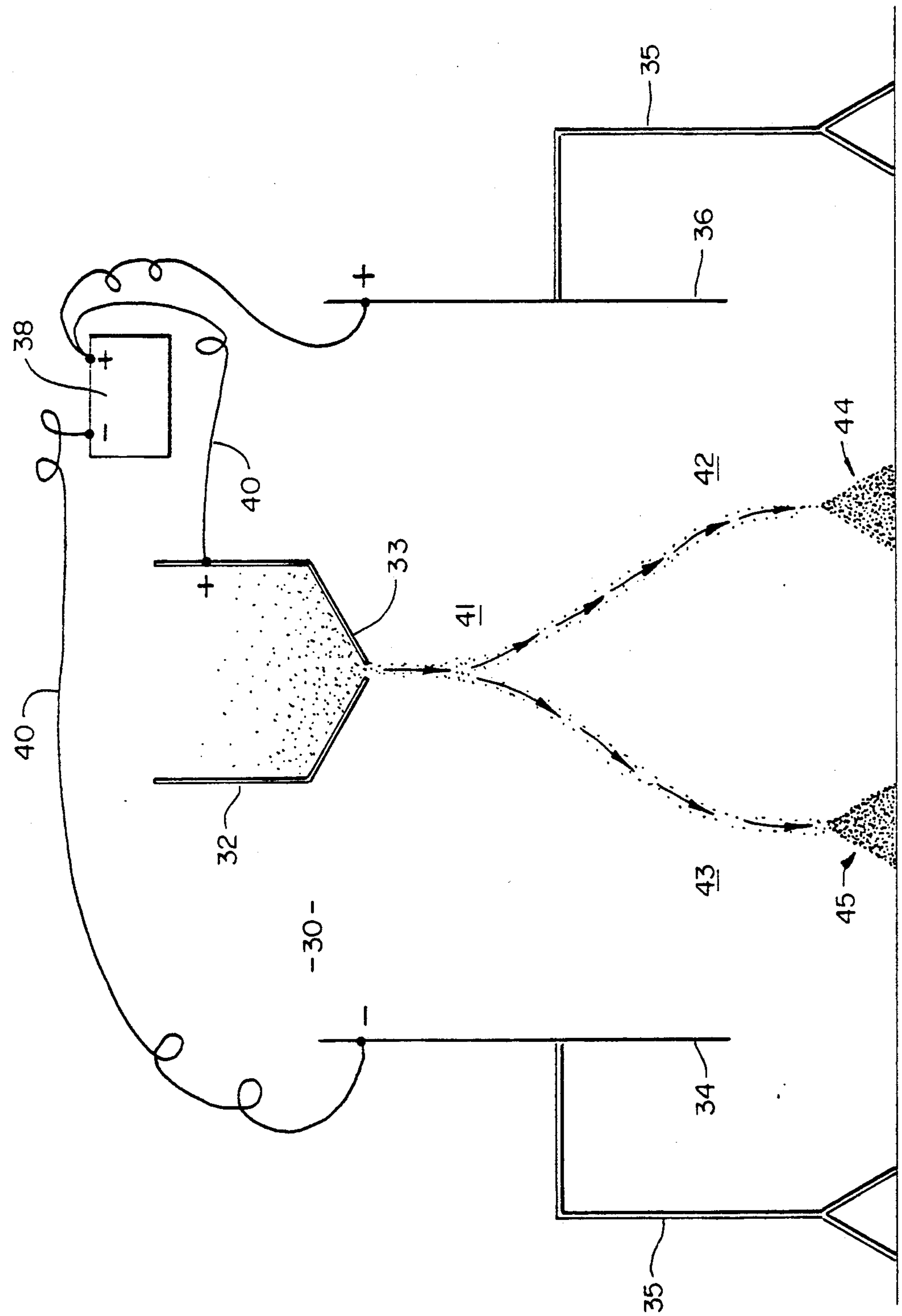
FIG. 3 is a diagrammatic side elevation of a second experimental electrostatic plastic material separator.

FIG. 3 discloses a second embodiment of an electrostatic separator 30 in which a precharge hopper 32 is suspended a vertical distance above and between two oppositely charged plates 34, 36, wherein the negative terminal of a generator 38 is attached to one plate 34 and the positive terminal of the generator 38 is attached to the other plate 36 as well as to the precharge hopper 32 by means of leads 40. The vertical plates 34, 36 are composed of a conductive material, such as aluminum foil and are vertically supported by mount stands 35. The plates, therefore, define two oppositely charged electrostatic fields beneath suspended precharge hopper 32.

In use, mixed PVC/PET, or other ground and commingled plastic particles, each typically having a size of ⅜ inch or less are placed in the precharge hopper 32 and are electrostatic charged the precharge hopper 32 being composed of an insulating material, preferably of a plastic material to be separated (PET, in this embodiment) which allows free migration of electrons allowing the PVC particles to become positively charged and the PET particles to become negatively charged.

The mixed PET/PVC particles upon receiving the induced electrostatic charge are allowed to free fall under the influence of gravity by opening of a gate 33 of the precharge hopper 32. As the stream of mixed particles 41 fall between the oppositely charged poles 34, 36 the negatively charged PVC particles are drawn toward the positive pole 34 and the positively charged PET particles are drawn toward the negatively charged pole 36 producing two divergent streams 42, 43 of pure PVC and pure PET respectively. It has been found that plates possessing equal and opposite charges of +60 KV producing a total potential of 120 KV will create horizontal displacement of greater than ½ cm for each 1 cm of vertical drop. The separated streams 42, 43 of form individual 44, 45 of charged PVC and PET particles which can then be collected. The separator of FIGS. 1 and 2 was designed and run though, some modifications were made as results became apparent. Generally, 25 grams of PET and 25 grams of PVC were used in the trial. Three collections were made from each run; PET - PVC - MINGLINGS.

Each collection was weighed and then separated by hand into components (contamination of each stream, i.e., how much PVC in the PET collection). There was a general loss of both PET and PVC from particles falling off the sheet, getting stuck to adhesives used to located diverter plates, etc. These losses were discounted from the outcome as having no bearing on results because the loss was due to the crude structure not the underlying principle.

Various PVC bottles (clear, brown and yellow) were used in the trial. Different PET materials were used also (clear, green and amber). No discernable differences were recorded using the different resins.

General atmospheric conditions were noted such as hot and humid, clear and cool, etc.

RESULTS

The order of best to worst results for PET:PVC separation with the temperature variable is:

Dried
Hot
Room temperature
Refrigerated

This makes apparent sense as moisture will block the electrostatic field. The refrigerated material has condensation that apparently forms on the surface giving problems while the room temperature material has absorbed moisture that causes some interference.

However, please note that except for the refrigerated material, separation rates of 95–100% occurred for all the temperature variables.

During the trials an important observation was made. As the trial proceeded, it was noted that the separation became 100% and that most of the contamination (% of PVC in PET and vice versa) occurred at the start of the trial. Precharging the material in the holding hopper significantly helped to achieve better separation. However, another phenomenon was observed. If too much charge was given to the particles then the PET and PVC particles would stick together and separation would not occur.

A "middle of the road" charge is required on the materials so they will have enough energy to jump to their respective (opposite charged) poles but not so much energy they are attracted to each other.

The generating device that was used is called a windshurst generator. It is a handcranked device that allows a small electrostatic charge to be generated. The leads were connected to the aluminum foil as noted in the sketch. In this manner we were able to create continuous and "wide" (as opposed to a point) poles. Handcranking the generator gave between 3,000 and 10,000 volts as measured with a handheld meter.

Two different particle sizes were tried. The first was plastic that was put through a grinding device that had a ¼ inch screen. The second size particles were those put through a ⅜ inch screen.

The smaller sized particles separated easier than the larger size, however, the larger size did also separate although at a lower point on the inclined sheet. It is theorized that this is because a large enough charge could not be placed on the larger particles with the handheld device. A commercial unit would probably generate 50,000 to 100,000 volts, thus, giving sufficient charges to be attracted quickly to its opposite pole.

Another experiment on the separation technique as well as additional calculations have been completed. The protocol and results are as noted below.

A 2 liter soft drink bottle (PET) and a Windex bottle (PVC) were purchased. The bottles were cut into small pieces of which 20 particles of each material were placed into a glass jar. The jar was capped and shaken for 15+ minutes to induce a static charge on the surface of each particle.

Each particle was then removed and measured for the total charge

| RESULTS PIECE # | PVC CHARGE | PET CHARGE |
|---|---|---|
| 1 | −.69 | +.10 |
| 2 | −.60 | +.41 |
| 3 | Not available | +.10 |
| 4 | −.30 | +.06 |
| 5 | −.18 | +.37 |
| 6 | −.55 | −.08 |
| 7 | −.72 | +.15 |
| 8 | −.50 | +.21 |
| 9 | −.55 | +.75 |
| 10 | −.68 | +.34 |
| 11 | −.27 | +.23 |
| 12 | −.61 | +.66 |
| 13 | −.59 | +.37 |
| 14 | −.43 | +.49 |
| 15 | −.32 | −.45 |
| 16 | −.32 | +.50 |
| 17 | −.68 | +.12 |
| 18 | −.63 | +.34 |
| 19 | −.11 | −.02 |

-continued

| RESULTS PIECE # | PVC CHARGE | PET CHARGE |
|---|---|---|
| 20 | −.44 | +.26 |

CALCULATIONS

PVC: total charge $Q=-9.56\times10^{-9°}$ C., total mass $M=0.8071$ grams $$Q/M = \frac{-9.56 \times 10^{-9}}{.8071 \times 10^{-3}} = -1.185 \times 10^{-5}\ \text{C/Kg}$$

PET: total charge $Q=+5.36\times10^{-9°}$ C., total mass $M=0.4609$ grams $$Q/M = \frac{+5.36 \times 10^{-9}}{.4609 \times 10^{-3}} = +1.163 \times 10^{-5}\ \text{C/Kg}$$

C=Coulombs; Kg=Kilograms

An analysis of a physical free fall (see FIG. 3) with gravity forces and electrostatic charge (force) divided by the mass was conducted. Assumed were two vertical plates (poles) one plate having +60 Kv and the other −60 Kv thus the total potential=120 Kv or 10 Kv/inch.

The results show that for every 1 cm vertical drop more than ½ cm horizontal movement can take place.

We claim:

1. A method of separating mixed fragments of different plastic materials, the materials to be separated being capable of carrying electrostatic charges of opposite polarities, comprising the steps of:

a) inducing said electrostatic charges in said materials;

b) exposing the charged materials to electrostatic fields of opposite polarities;

c) allowing said charged materials to migrate toward their respectively oppositely charged fields thereby to separate said materials; and d) collecting the separated material fragments;

wherein the induced electrostatic charges in said materials are sufficient to facilitate said migration while being insufficient for the fragments of said materials to be attracted to each other sufficiently to prevent said migration.

2. An apparatus for carrying out the method of claim 1 comprising:

a) means for inducing said electrostatic charges in said mixed material fragments;

b) means for producing separate electrostatic fields of opposite polarities;

c) means for exposing said charged fragments to said fields;

d) means facilitating migration of said charged fragments toward said respectively opposite polarity fields; and e) collecting the separated material fragments.

3. An apparatus according to claim 2 wherein the charged fragments are exposed to said electrostatic fields of opposite polarities while being conveyed along an inclined vibrating sheet.

4. An apparatus according to claim 3 wherein the inclined vibrating sheet is made from an insulating material.

5. An apparatus according to claim 4 wherein the inclined vibrating sheet is made from a plastic material which is the same as one of the materials to be separated.

6. An apparatus according to claim 3 wherein the migration of the charged plastic fragments towards respectively oppositely charged electrostatic fields is facilitated by means of path diverters positioned along the top of the inclined sheet.

7. An apparatus according to claim 2 wherein the charged fragments are exposed to said electrostatic fields of opposite polarities by means of allowing the charged fragments to free fall between two vertically standing and oppositely charged conductive plates.

8. An apparatus according to claim 3 wherein the means for producing separate electrostatic fields is capable of supplying a range of about 1,000 to 10,000 volts.

9. A method according to claim 1 further comprising the step of inducing sufficient electrostatic charge in said materials to cause them to be attracted toward a respectively oppositely charged field without inducing interparticular attraction between particles of unlike charge.

10. A method according to claim 9 further comprising the step of inducing said charge for a period of about 30 to 60 seconds.

* * * * *